US009309015B2

(12) United States Patent
Overley et al.

(10) Patent No.: US 9,309,015 B2
(45) Date of Patent: Apr. 12, 2016

(54) PACKAGING EQUIPMENT FOR ROLLED PAPER PRODUCTS

(71) Applicant: The Procter & Gamble Company, Cincinnati, OH (US)

(72) Inventors: Matthew Bernard Overley, Deerfield Township, OH (US); Wesley Bernard Brokopp, Jr., Liberty Township, OH (US); Andre J. K. De Saert, Lebbeke (BE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 14/319,291

(22) Filed: Jun. 30, 2014

(65) Prior Publication Data
US 2015/0375879 A1 Dec. 31, 2015

(51) Int. Cl.
*B65G 47/26* (2006.01)
*B65B 35/30* (2006.01)
*B65G 47/30* (2006.01)

(52) U.S. Cl.
CPC ............ *B65B 35/30* (2013.01); *B65G 47/30* (2013.01)

(58) Field of Classification Search
CPC .. B65G 47/71; B65G 47/082; B65G 2201/02; B65G 47/088; B65G 47/084
USPC ........................ 198/429, 432, 433, 445, 419.3
See application file for complete search history.

(56) References Cited

U.S. PATENT DOCUMENTS

| | | | | |
|---|---|---|---|---|
| 3,160,259 A | * | 12/1964 | Dalton | 198/432 |
| 3,938,650 A | * | 2/1976 | Holt | 198/419.3 |
| 4,440,289 A | * | 4/1984 | Weis | 198/448 |
| 6,463,713 B1 | * | 10/2002 | Ruemeli | 198/442 |
| 6,516,939 B1 | * | 2/2003 | Schmidt et al. | 198/458 |
| 7,380,650 B2 | * | 6/2008 | Gamberini | 198/369.1 |
| 7,784,599 B2 | * | 8/2010 | Balleza et al. | 198/432 |

OTHER PUBLICATIONS

U.S. Appl. No. 14/319,242, filed Jun. 30, 2014, Overley, et al.
All Office Actions in U.S. Appl. No. 14/319,242 and U.S. Appl. No. 14/319,291.

* cited by examiner

*Primary Examiner* — James R Bidwell
(74) *Attorney, Agent, or Firm* — Roddy M. Bullock

(57) ABSTRACT

An apparatus for laning rolled products is disclosed. The apparatus can include an infeed section having one or more adjacent infeed lanes. Each infeed lane can convey a plurality of rolled products in a first direction. The infeed section can feed rolled product to a transfer section, the transfer section receiving one or more of the plurality of rolled products from each lane of the infeed section. The transfer section can convey the one or more rolled products in a second direction substantially perpendicular to the first direction to a first or second discharge section. The first or second discharge sections can each have one or more adjacent discharge lanes for receiving the one or more rolled products from the transfer section. The first or second discharge sections can convey the one or more rolled products in a third direction substantially parallel to the first direction. A displacement device can transfer rolled products from the transfer section onto the first or second discharge sections. In operation, the number of discharge lanes can be equal to, less than, or greater than the number of infeed lanes.

17 Claims, 13 Drawing Sheets

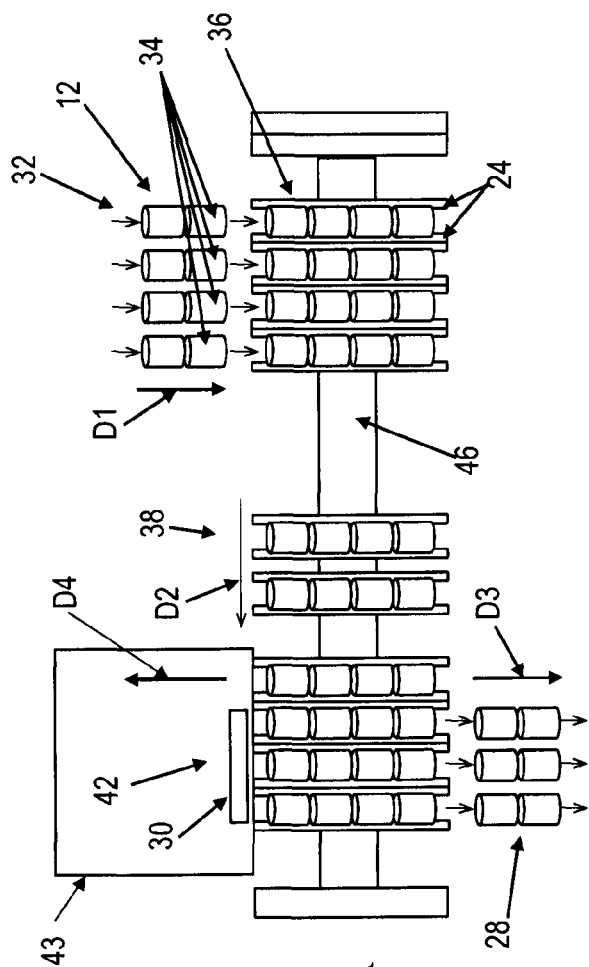
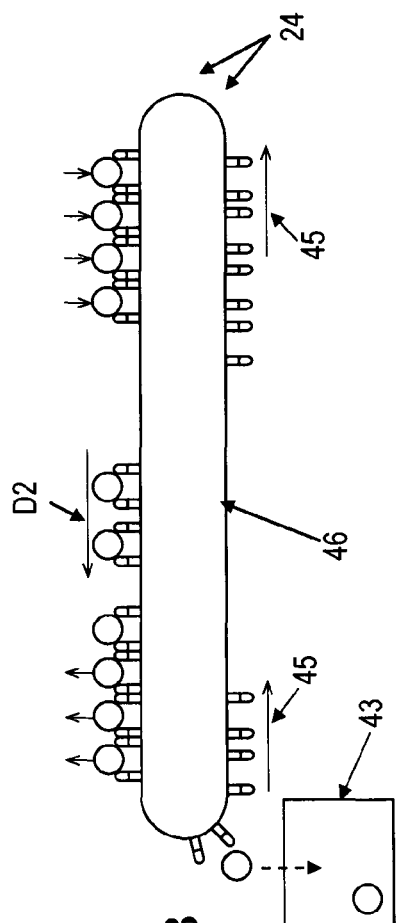
Fig. 7A
Fig. 7B

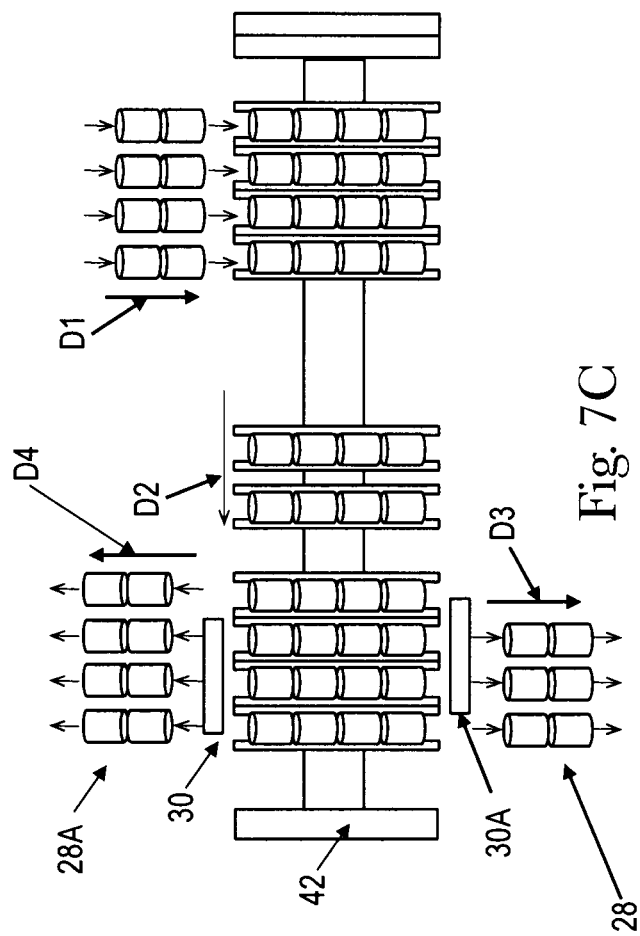

PACKAGING EQUIPMENT FOR ROLLED PAPER PRODUCTS

FIELD OF THE INVENTION

The invention relates to equipment for conveying and packaging rolled paper product, such as toilet tissue and paper towels.

BACKGROUND OF THE INVENTION

Rolled paper products such as toilet paper and paper towels are produced in a converting process that involves cutting a long "log" of the rolled paper product into the final lengths for further converting or packaging. For example, paper towel paper can be wound onto a cardboard core to form a log having a length of 110 inches long and a diameter of about 5 inches. This log is then cut in a log saw operation to produce multiple rolled products each having a final roll length, for example, to a length of about 11 inches.

A log saw typically cuts more than one log at a time. Logs can enter the log saw operation in parallel lanes, and typically from 2 to 5 logs can be sawn in a single saw operation. Thus, 2 to 5 lanes of cut-to-length rolls of product can be output from the log saw operation by a conveyor system that conveys the product in parallel lanes. These lanes of product continue to a subsequent process, such as primary packaging, e.g. wrapping or cartoning. The primary packaging can be further processed by secondary packaging, e.g. bundling or casepacking Rolls of product can be characterized as having a central longitudinal axis aligned parallel and central to a paper or cardboard core, and are generally marketed in a vertical orientation, that is, with the longitudinal axis oriented vertically. A bundled package of rolled paper products can be configured in virtually any manner of multiple columns of vertically oriented stacked rolls. For example, four columns of three stacked rolls can be bundled for a package containing twelve rolls.

If the final package is configured to have fewer or more columns of stacked rolls of product than the number of the lanes of the conveyor from the log saw operation, the lanes of product must be manipulated to go from the number of lanes coming from the log saw to the number of lanes required for bundling. Taking the example above, if three columns of two stacked rolls is to be packaged, the four lanes of product from the log saw must be manipulated such that three lanes of two rolled products at a time are transported to the packaging operation. This manipulation gives rise to various manufacturing complexities and problems, such as requiring "funneling" chutes which funnel lanes of product into the desired number of lanes for bundling, or complicated laning/gate mechanisms if more columns are needed than are provided by the log saw. One example of current systems for laning rolled product from a log saw is shown in U.S. Pat. No. 7,114,609.

Accordingly, there exists a need for an improved laning operation for rolled product output from one unit operation with a first number of adjacent, parallel lanes, to be input into another operation in a different number of adjacent, parallel lanes.

SUMMARY OF THE INVENTION

An apparatus for laning rolled products is disclosed. The apparatus can include an infeed section having one or more adjacent infeed lanes. Each infeed lane can convey a plurality of rolled products in a first direction. The infeed section can feed rolled product to a transfer section, the transfer section receiving one or more of the plurality of rolled products from each lane of the infeed section. The transfer section can convey the one or more rolled products in a second direction substantially perpendicular to the first direction to a first or second discharge section. The first or second discharge sections can each have one or more adjacent discharge lanes for receiving the one or more rolled products from the transfer section. The first or second discharge sections can convey the one or more rolled products in a third direction substantially parallel to the first direction. A displacement device can transfer rolled products from the transfer section onto the first or second discharge sections. In operation, the number of discharge lanes can be equal to, less than, or greater than the number of infeed lanes.

BRIEF DESCRIPTION OF THE DRAWINGS

FIG. 7A is a schematic plan view of an apparatus of one embodiment of the invention.

FIG. 7B is a schematic elevation view of an apparatus of one embodiment of the invention.

FIG. 7C is a schematic plan view of an apparatus of one embodiment of the invention.

DETAILED DESCRIPTION OF THE INVENTION

The system and method of the present invention utilizes an apparatus for conveying rolled products in lanes from a first unit operation to a second unit operation, with the option of changing the number of lanes between the first unit operation and the second unit operation. As described herein, the rolled products are rolled paper products, and the first unit operation is a log saw and the second unit operation is a packaging operation that packages multiple finished rolled products into a final package for further bundling and/or cartoning, and ultimately for shipping and marketing. Log saws and packaging equipment are well known in the art of converting paper towels and bath tissue (toilet paper) from parent rolls into finished, packaged product. However, the invention is not intended to be limited only log saws and packaging equipment for rolled paper products; any process requiring changes in lanes from one process to another can benefit from the invention disclosed herein.

As known in the art, a log saw cuts one or more relatively long logs of rolled paper to product multiple rolled products in final form (i.e., final length) units prior to the units being packaged and or bundled, e.g., for retail sale. The log saw can cut more than one log at a time, and typically cuts two to five logs at a time, the relatively long logs entering the log saw in parallel lanes. The description below will describe the apparatus in terms of a four-lane log saw. After being cut to final form, the rolled products are conveyed in parallel lanes to a packaging operation. The process of conveying rolled products in parallel lanes is termed herein as "laning". The present invention overcomes the problems associated with packaging more or fewer lanes of rolled product than leave the log saw. For example, it may be that the log saw cuts four logs at a time, thus sending out four lanes of rolled products, and the package size may be set to receive only three lanes of rolled product. Thus, the log saw outputs a substantially continuous stream of products in four lanes, and the packager can require a predetermined number of rolls in a different number of lanes (i.e., fewer or more than what the log saw outputs). The apparatus and the method of the present invention can facilitate a smooth and efficient transition from, for example, four lanes of a continuous stream of rolled products to three lanes of a limited, predetermined number of rolled products for packaging. In general, the apparatus and the method of the present invention can be used to go from any number N of lanes from the log saw to any number M of lanes feeding a bundler/packaging apparatus, where M can be less than, equal to, or greater than N.

Figure 1:
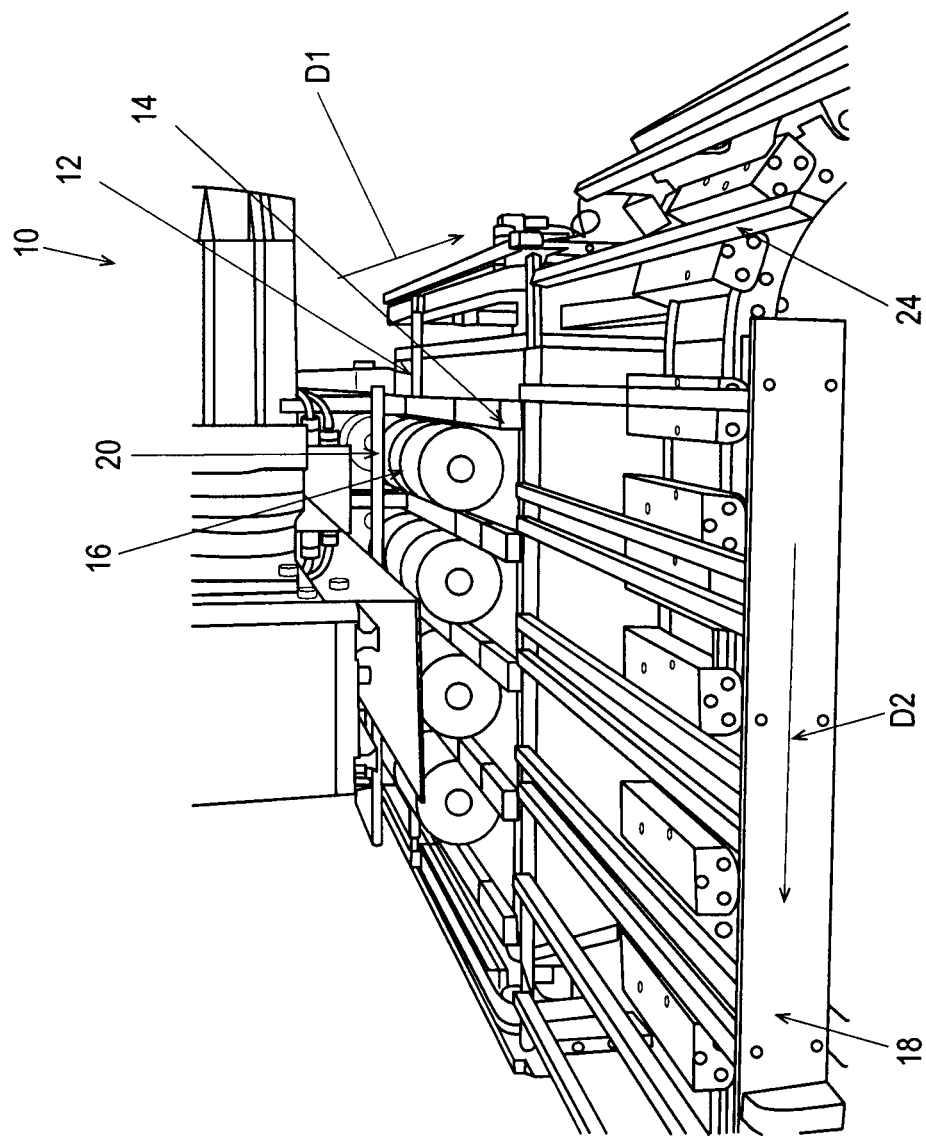
FIG. 1 is a perspective view of a portion of the apparatus of the invention showing in particular the infeed section.
Figure 2:
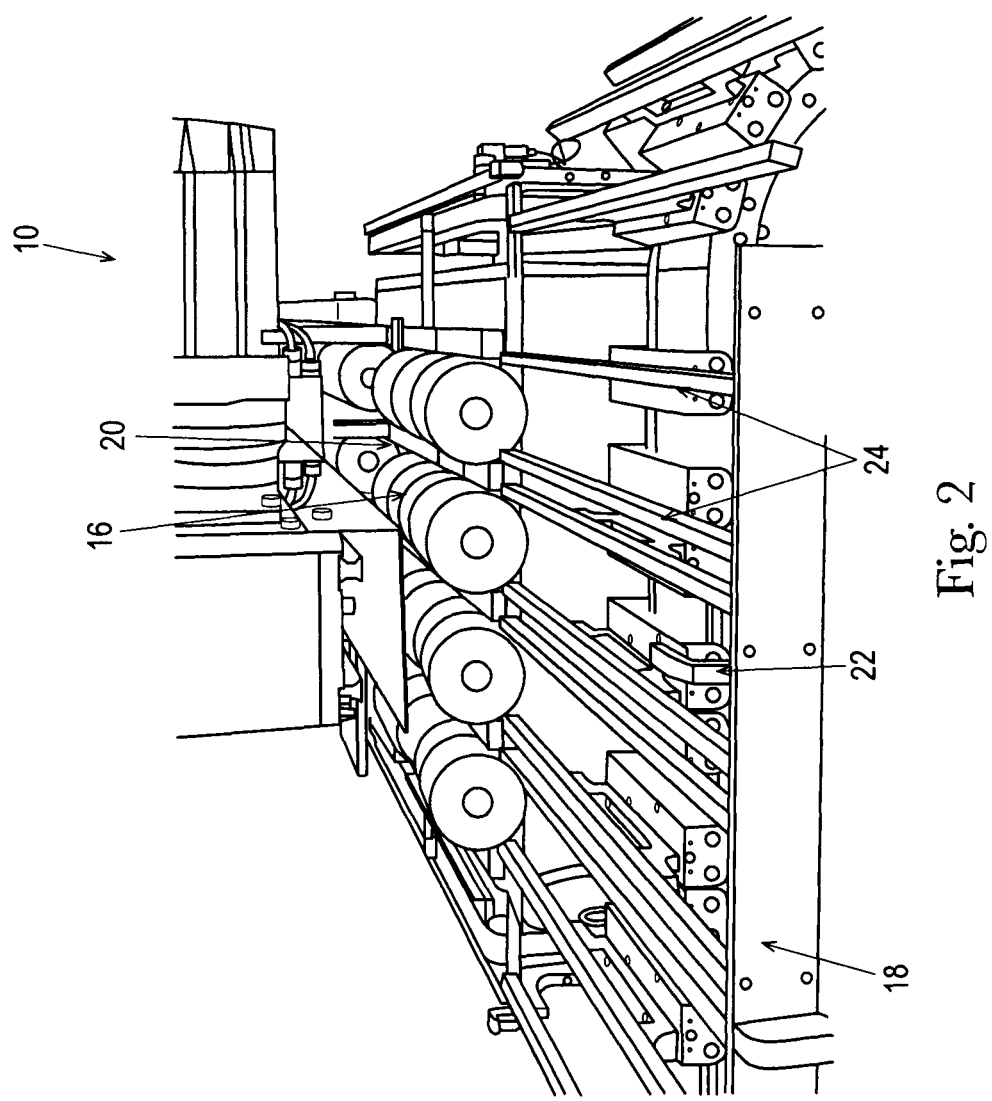
FIG. 2 is a perspective view of a portion of the apparatus of the invention showing in particular rolled product being conveyed from an infeed section to a transfer section.

FIG. 1 shows a portion of an apparatus 10 for laning rolled products from a first unit operation such as a log saw (not shown) to a second unit operation such as a packager (not shown). As shown in FIG. 1, an infeed section 12 can have four parallel infeed lanes 14, each of which convey a substantially continuous line of cut rolled products 16 in a first direction D1. As depicted in FIG. 1, the rolled products in each of the four lanes have reached the end of the infeed section and are about to be moved onto a transfer section 18 which will move the rolled products in a second direction D2. A predetermined number of rolled products can be moved onto transfer section 18 by a first displacement device 20, which can be a reciprocating pusher bar as shown in FIG. 1, or an equivalent device designed to move a predetermined number of rolled products from the effectively endless stream of rolled products on the infeed section 12 onto the transfer section 18. As shown in FIG. 1, for example, a pusher bar 20 can reciprocate back and forth parallel to the direction D1, going over (i.e., above) the rolled products 16 in the direction opposite to D1 and lowering down to push the rolls in the direction of D1 onto the transfer section 18. Thus, for example, as shown in FIG. 2, the first displacement device 20 can lower and push a predetermined number of rolled products in each lane, such as 2-10 rolls (the number is determined by the eventual package size desired), from the effectively endless stream of rolled product coming from the log saw operation, onto transfer section 18.

Transfer section 18 receives the rolled products 16 from the infeed conveyor. The rolled products from each lane are received onto and conveyed by a roll support 22, which can be, as shown in FIGS. 1 and 2, a pair of generally parallel support bars 24, between which the rolled products from one lane are cradled. Thus, if, as shown in FIGS. 1 and 2, four lanes of rolled products leave the log saw, the four lanes are received on the transfer section 18, and each lane of rolled products is supported by a roll support 22 of two parallel support bars 24.

In an embodiment, the support bars 24 are each independently moveable in the direction D2. By independently moveable is meant that each support bar 24 can be moved in the direction D2 at a desired distance and at a desired rate independently relative to adjacent support bars 24. Thus, the spacing between a pair of support bars 24 intended to cradle rolled products (i.e., a roll support 22) can be set based on the diameter of the rolled products. Further, the rate of movement of any two roll supports 22 can be different, such that one set of rolled products on a first roll support 22 can be transferred in the direction D2 at a rate and/or distance different than a second roll support 22.

Figure 3:
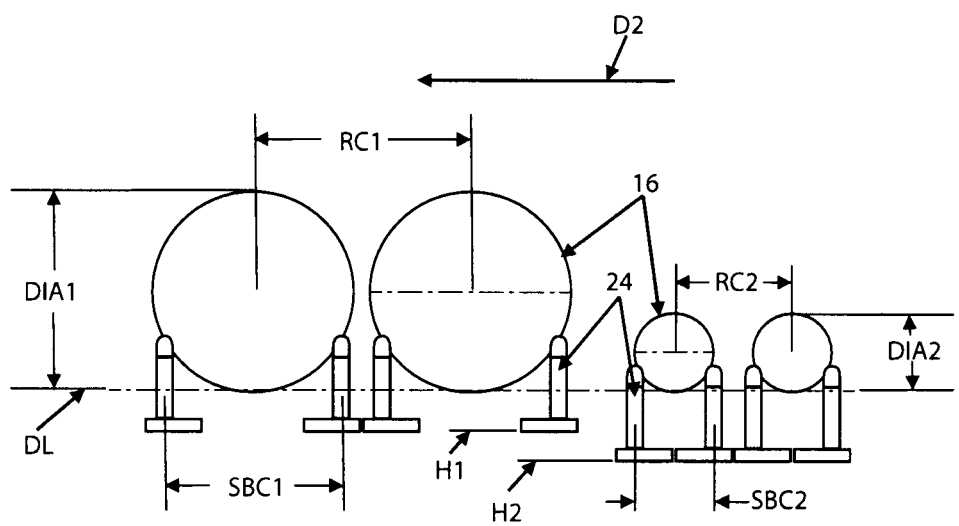
FIG. 3 is a schematic elevation view of roll holders of the present invention.

FIG. 3 is a schematic diagram showing the benefit of independently spaceable support bars 24. FIG. 3 depicts two pairs of rolled products 16, representing two different roll diameters, DIA1 for relatively larger diameter rolls, and DIA2 for relatively smaller diameter rolls. For stability purposes, the spacing of supports bars, SBC1 and SBC2, respectively, is set such that the rolls resist displacement when support bars 24 are moved in direction D2. The actual spacing SBC1 or SBC2 can be adjusted within a working range as desired for various roll operations. For rolled tissue paper, an optimum spacing between support bars 24 can be determined by the method defined in more detail below, referring to FIG. 10. As shown in FIG. 3, adjacent rolls can have a center-to-center spacing RC1 and RC2, respectively, which is determined by the lane spacing requirements of the infeed section and/or the discharge section (discussed below). In an embodiment, the structure and spacing of the support bars 24 can be such that RC1 and RC2 approach DIA1 and DIA2, respectively.

The schematic diagram of FIG. 3 also illustrates another feature useful in the apparatus of the present invention, namely the ability to set the vertical elevation of rolled products by setting the vertical elevation of the support bars 24. As shown in FIG. 3, for example, the support bars 24 of the relatively larger diameter rolls are set at an elevation H1 and the support bars 24 of the relatively smaller diameter rolls is set at an elevation H2. The ability to set the relative elevation of the support bars is advantageous because it allows the bottom of the rolled product, regardless of diameter, to be positioned at an elevation equal or close to the level of the discharge unit (described below), i.e., a discharge level DL.

Figure 4:
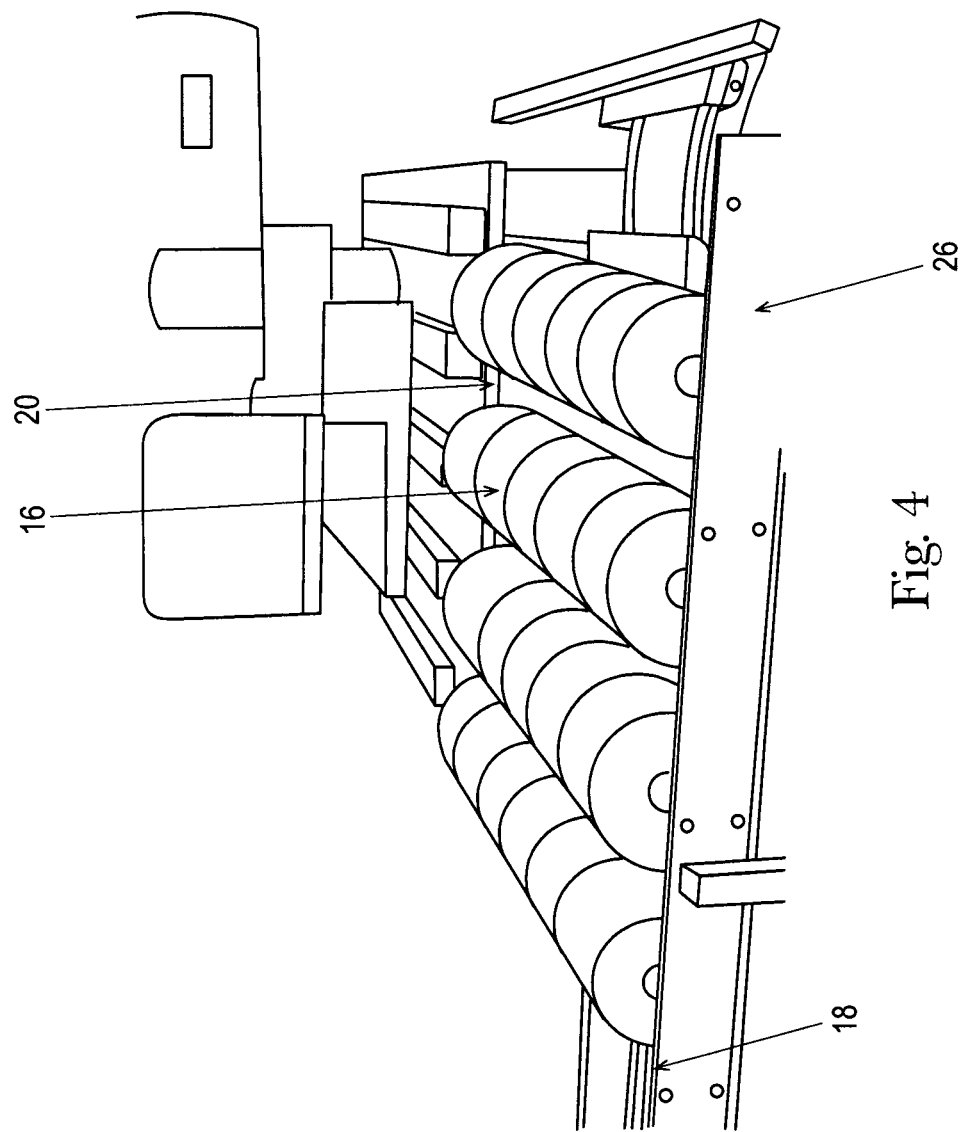
FIG. 4 is a perspective view of a portion of the apparatus of the invention showing in particular rolled product on a transfer section.
Figure 5:
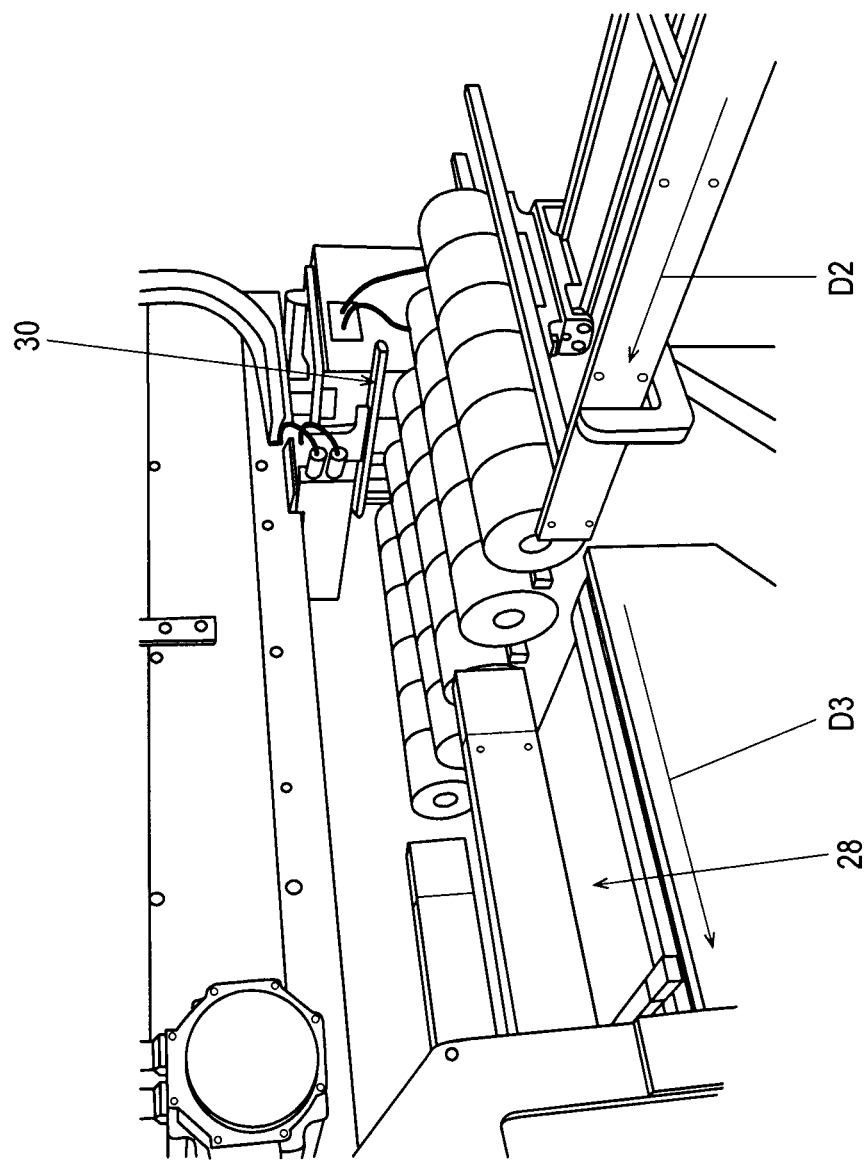
FIG. 5 is a perspective view of a portion of the apparatus of the invention showing in particular rolled product on a transfer section ready to be conveyed to a discharge section.

The first displacement device 20 pushes the rolled product 16 onto the transfer section 18, in an embodiment by pushing until the rolled product is stopped by a backstop 26, as shown in FIG. 4. In another embodiment no backstop is required; the first displacement device 20 simply pushes the rolled product 16 a predetermined distance onto the transfer section 18. The received rolled product on the transfer section is then transferred in the direction D2 to a discharge section 28, as shown in FIG. 5. In an embodiment, direction D2 is perpendicular to direction D1. To transfer to the discharge section 28, a second displacement device 30, which can be a second pusher bar the same as or similar to that described above as the first displacement device, is utilized to push off one or more lanes of rolled product in a third direction D3 to be conveyed in one or more lanes to a packaging/bundler operation. In an embodiment, direction D3 is perpendicular to direction D2 and parallel to direction D1.

Figure 6:
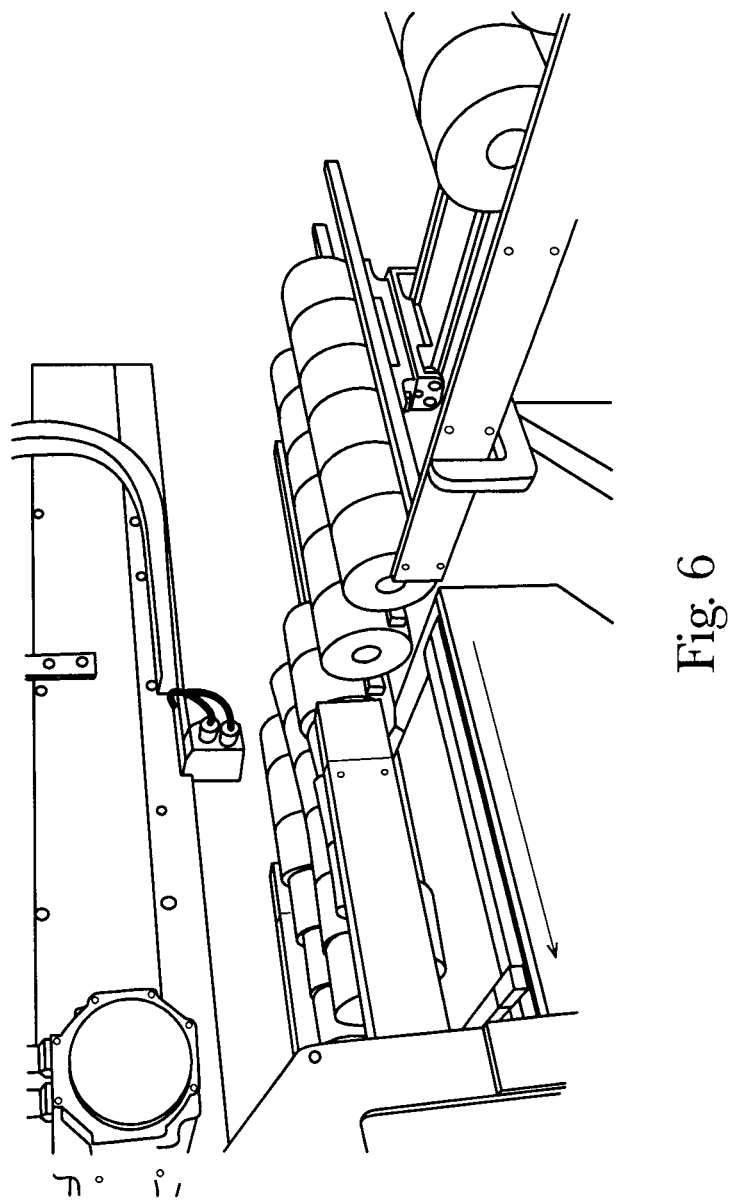
FIG. 6 is a perspective view of a portion of the apparatus of the invention showing in particular rolled product on a transfer section and some rolled product conveyed to a discharge section.

As shown in a non-limiting embodiment in FIG. 5, five lanes of rolled product are staged for discharge, but only three lanes will be discharged, as shown in FIG. 6. That is, FIGS. 5 and 6 are representative, for example, of a situation where three lanes of rolled product were discharged from a previous set of four lanes from the log saw, leaving one, and then another set of four lanes from the log saw were moved to be adjacent to the one left, making five lanes of rolled product staged for discharge. As can be understood from considering FIGS. 5 and 6, four adjacent lanes of rolled product leaving the log saw can be discharged in groups of three adjacent lanes for packaging in a discharge motion that is independent in time and space from the infeed to the transfer section. That is, the number of adjacent, parallel discharge lanes is decoupled from the number of adjacent, parallel infeed lanes.

As can be understood from the description herein, and with reference to FIGS. 5 and 6, after the first three lanes are discharged, one is left. When the next four arrive three more discharged, leaving two, as shown in FIG. 6.

In prior art devices, there could be a spacing gap between the two lanes left and the next set of four lanes arriving for discharge. To get adjacent lanes for packaging, three non-adjacent lanes are then "funneled" or otherwise operated on to form into three adjacent lanes. In operation of the present invention, in this example, the first four adjacent lanes of rolled product are transferred to the discharge section, and three adjacent lanes are discharged, leaving one lane of rolled product from the original four. In the meantime, four more lanes are transferred from the log saw, any or all of which can be moved to join the remaining single lane of rolled product, making up to five adjacent lanes awaiting discharge. Because each roll support 22 operates independently in space and time, two of the four arriving lanes can be moved adjacent the one remaining lane, and the second displacement device then pushes off the three now-adjacent lanes, leaving two adjacent lanes. In the meantime, a set of four more adjacent lanes are moved in direction D2 to join the remaining two, from which three now-adjacent lanes can be discharged, and so on. As can be understood from the above description, by decoupling each roll support in time and space, any number of adjacent infeed lanes from the log saw can be transferred and discharged in any number of adjacent discharge lanes, eliminating the need for funneling or other disruptive operations to ensure the number of adjacent lanes going to bundling and packaging operations.

The method and apparatus of the invention is shown schematically in FIGS. 7A and 7B. FIG. 7A is a schematic top view of the apparatus 10. As shown at 32, rolls enter from a first unit operation, such as a log saw (not shown), at an infeed section 12 in parallel, adjacent lanes. The rolls enter in a generally steady stream of adjacent, parallel lanes 34 in a direction D1; four lanes are depicted in FIG. 7A. At 36 four rolled products in each of the four adjacent lanes are situated on the transfer section 18 after having been pushed off of the effectively endless stream of rolled products coming from the infeed section.

At 38 one or more roll supports 22 move one or more lanes, respectively, of rolled product in the direction D2 to the discharge station. The roll supports 22 operate on a motive track 46, which can be any track having the capability to move individual roll supports 22 in an independently controlled manner in the direction D2 to discharge section 28.

At 42 one or more adjacent lanes of four rolled products can be staged for discharge to discharge section 28. As shown in FIG. 7A, the system illustrated is configured to push off three adjacent lanes of rolled product to the discharge section 28 by second displacement device 30. Thus, as illustrated schematically in a non-limiting embodiment, the apparatus of the present invention allows a number N (in this example N=4) adjacent lanes of rolled product to be fed from an infeed conveyor and output as a different number M (in this example M=3) of adjacent lanes of rolled product for further packaging/bundling or other processing. In general, virtually any number M of adjacent lanes can be discharged. For example, if it was desired that nine adjacent lanes of rolled product be discharged at the discharge section the system would transport the first two flights of four roll supports from the infeed section and then at least one more roll support to provide for nine adjacent lanes awaiting discharge at 42. Once all nine (or more) lanes of rolled product are positioned for discharge a suitable second displacement device (in this case configured to push nine adjacent lanes) can push off nine lanes to the discharge section.

Thus, in an embodiment, the invention can be described as an apparatus for transferring lanes of rolled products, the apparatus including an infeed section capable of feeding one or more adjacent infeed lanes of rolled products, and at least one discharge section operatively associated with the infeed section, each of the one or more discharge sections being capable of receiving at least one of the one or more adjacent lanes of rolled products from the infeed section. As disclosed herein, each of the discharge sections can be laterally offset from the infeed section, that is, spaced such that a centerline of the infeed section does not line up with a centerline of the discharge section.

In an optional embodiment, and illustrated schematically in FIG. 7A, rather than being discharged for further converting such as packaging and bundling, lanes of rolled product can be moved to a discard, or reject, station 43, which can be a chute, box, bin, or other container for rejected product. For example, if a certain number of rolled products were known to be out of specification, and for quality control reasons to be rejected, rather than being pushed in the direction D3 onto the discharge section 28, the rolls could be pushed in the direction D4 to a reject station 43. Direction D4 can be opposite direction D3 In another embodiment, rather than stop at discharge section, roll supports 22 can continue with carried rolled products which then would fall by the force of gravity into a reject station 43, as depicted in FIG. 7B.

Also as shown in FIG. 7B, which is a schematic elevation view of the apparatus shown in FIG. 7A, in an embodiment roll supports 22, and, in particular, each support bar 24, can be operationally affixed to a continuous motive track 46. After transfer of rolled products to transfer section is complete, each support bar 24 is cycled back as shown by arrow 45 to receive more lanes of rolls from the infeed section.

Figure 8:
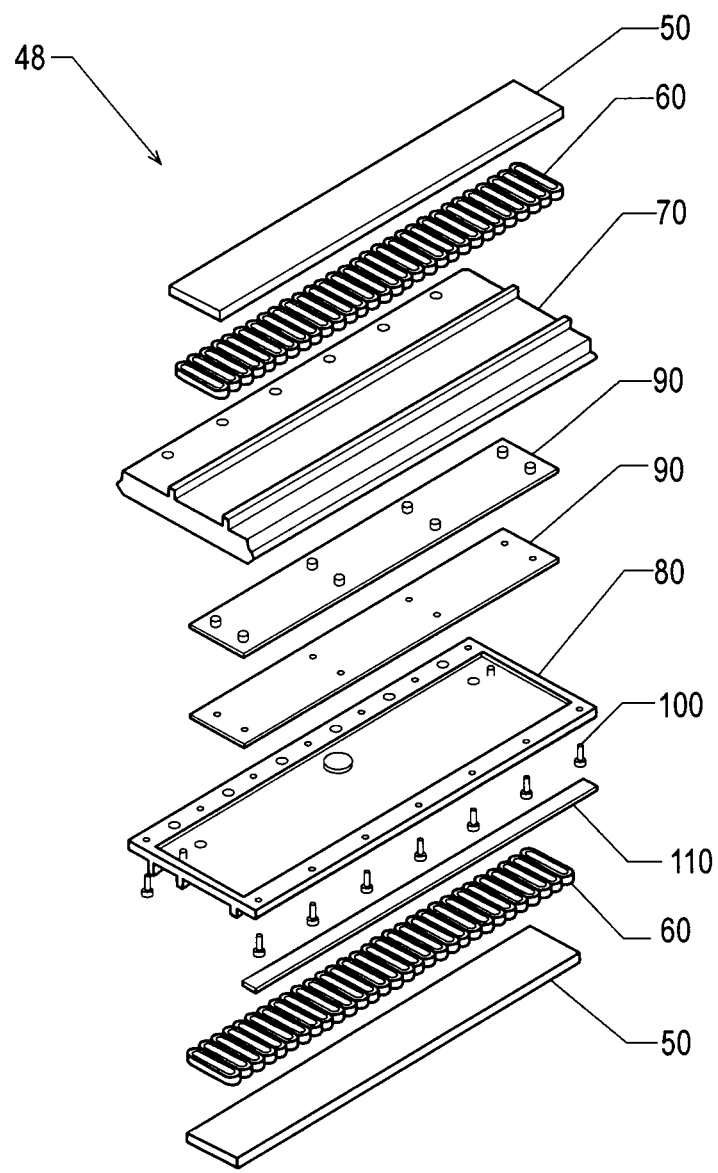
FIG. 8 is an exploded perspective view of an exemplary linear motor module for use in the invention.

In an embodiment, roll supports 22 can be mounted on roller bearings on a suitable track and can be individually chain driven. In an embodiment, support bars 24 can be mounted on "movers" as described in US 2013/0119897, published May 16, 2013 to Wernersbach et al., and U.S. Pat. No. 6,876,107, granted Apr. 5, 2005 to Jacobs, each of which are hereby incorporated by reference herein. In this embodiment the support bars 24 are independently controlled as movers mounted on linear motor modules mounted on a common frame. As shown in FIG. 8, an exemplary linear motor module 48 can include active elements 60 sandwiched between encapsulation 50 and stator top plate 70 or stator bottom plate 80, respectively. Controllers 90 can be mounted to the stator plates 70, 80, and fasteners 100 can fasten the assembly together, a control parameter sensor 110 can be mounted to the stator bottom plate 80. Active element 60 generally includes an electromagnetic armature coil and the control parameter sensor 110 is preferably a true absolute position sensor capable of determining the true absolute position of the movers 40 (not shown).

Figure 9:
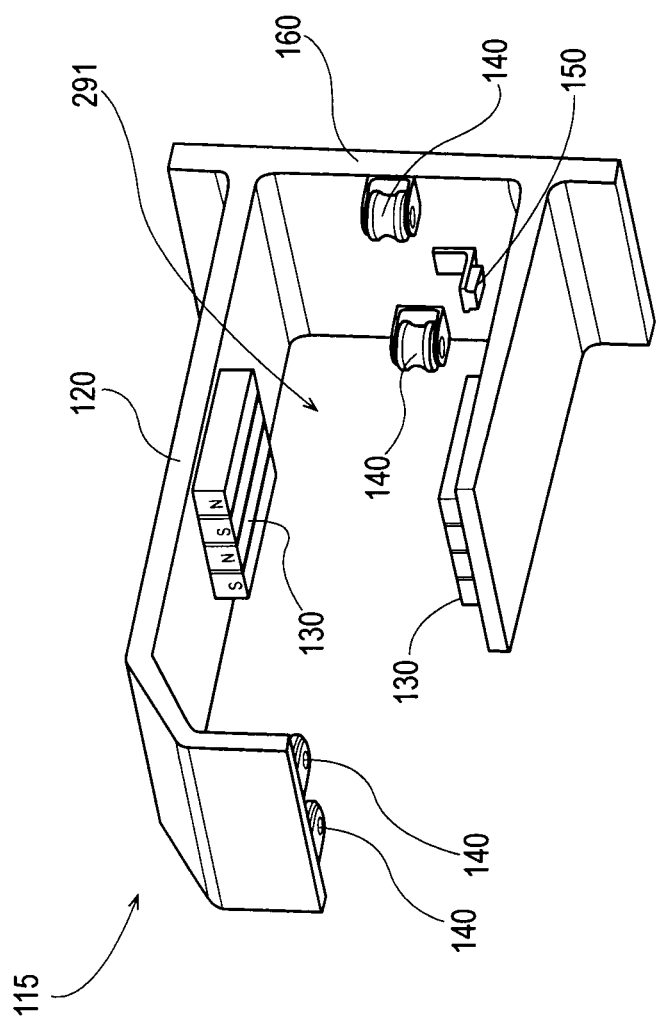
FIG. 9 is a perspective view of an exemplary mover for use in the invention.

Referring to FIG. 9, a mover 115 can include a carriage 120, to which are mounted reactive elements 130, roller wheels 140, and a control parameter sensor activation element 150, each preferably disposed in and facing carriage interior passage 291. Preferably, reactive element 130 includes a set of magnets, which are most preferably rare-earth permanent magnets, and the control parameter sensor activation element 150 includes a single permanent magnet. In a preferred embodiment, the mover 40 is configured to traverse the entire path along both the straight and curved modules 20. The active and reactive elements are associated to produce relative movement there between when the active elements are energized. A skilled person can modify the elements of the disclosure above in a variety of ways to optimize the manner in which the movement of the movers can be executed for specific tasks.

Figure 10:
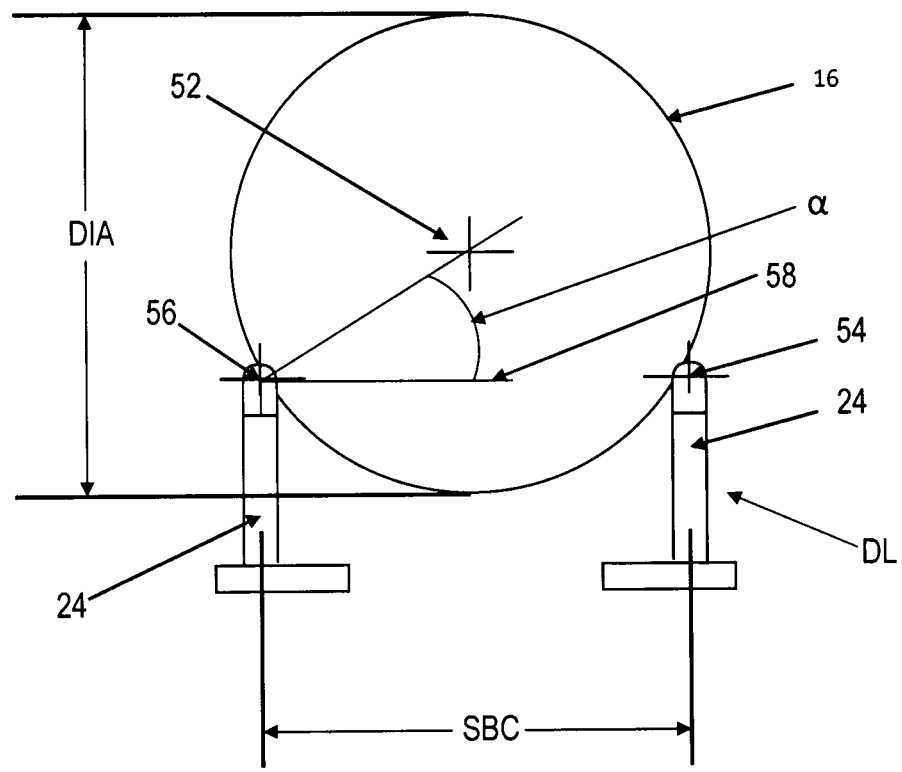
FIG. 10 is a schematic elevation view of an embodiment of a roll holder of the present invention.

FIG. 10 is a schematic diagram showing how the spacing SBC of support bars 24 can be adjusted based on the diameter DIA of a rolled product 16. As shown, the relationship between the longitudinal axis 52 of a rolled product 16 and a distal end 54 of a support bar 24 can form an angle α that has a vertex 56 at distal end 54, for example, at the radiused edge of a support bar 24. One leg 58 of angle α is parallel to a plane of corresponding to the discharge level DL and one leg intersects longitudinal axis 52. In an embodiment, angle α can be selected from a range of about 20 degrees to about 60 degrees to provide stability for rolled product 16 when put in motion in the direction D2, as discussed above. The description "angle α can be selected from a range of about 20 degrees to about 60 degrees" explicitly discloses every degree increment and range in between 20 degrees and 60 degrees. For example, the description includes 26 degrees as well as the range from 35 degrees to 40 degrees. Further, the diameter DIA can be an effective diameter, which is an average diameter when the rolled product 16 is not perfectly round.

Figure 11:
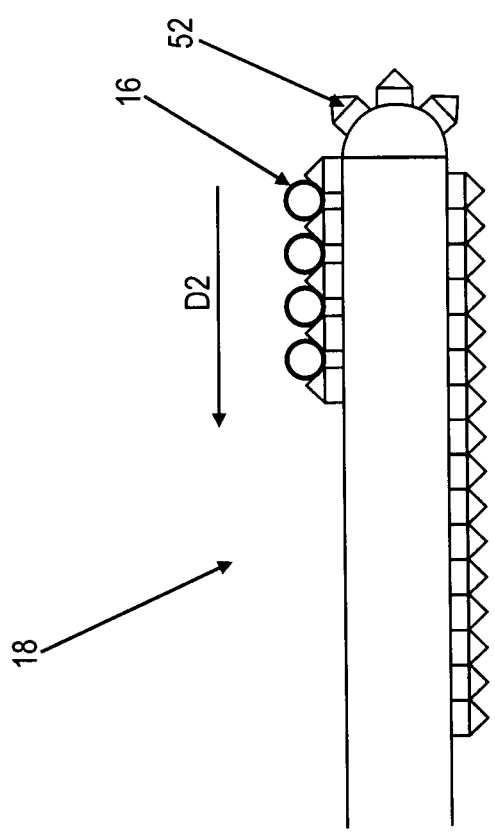
FIG. 11 is a schematic elevation view of an embodiment of an apparatus of the invention.

FIG. 11 shows schematically another form of roll supports for the transfer section 18. Viewing transfer section 18 in elevation, i.e., from the side, FIG. 11 shows that rather than having independent support bars 24 forming roll supports 22 as disclosed above, individual wedge-shaped bars 62 can support rolled product 16. One distinction over the above-described support bars 24 is, as shown, a single wedge-shaped bar 62 can provide partial support for two rolled products 16 as rolled products 16 are transported in the direction D2. Individual wedge-shaped bars can have any shape suitable for supporting rolled product 16 as shown, and can be spaced from adjacent wedge-shaped bars 62 at a distance suitable for holding rolled product 16 securely during transport in direction D2. As with support bars 24, each wedge-shaped bar 62 can be independently controlled in time and space, i.e., in rate and position to achieve the desired transport of rolled products 16.

Figure 12:
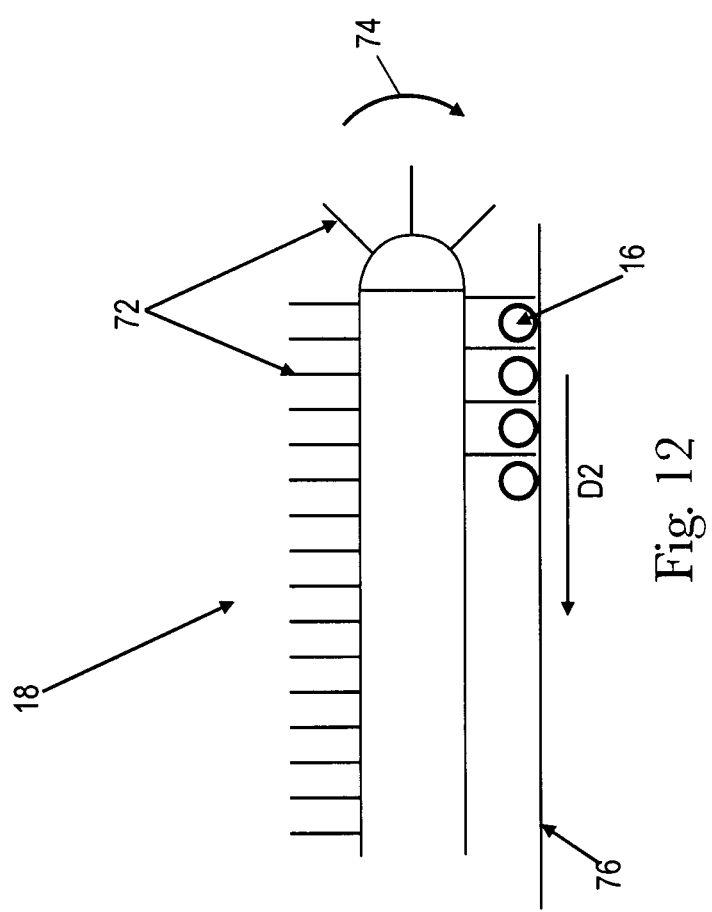
FIG. 12 is a schematic elevation view of an embodiment of an apparatus of the invention.

FIG. 12 shows schematically another form of a transfer section 18. Viewing transfer section 18 in elevation, i.e., from the side, FIG. 12 shows that rather than having independent support bars 24 forming roll supports 22 on which rolled products rest by gravity, as disclosed above, individual pusher bars 72 can be rotated about a track 72 located above rolled products 16. Individual pusher bars 72 can be independently controlled in time and space, i.e., in rate and position to achieve the desired transport of rolled products 16. In an embodiment as shown in FIG. 12, individual pusher bars 72 can be rotated about a track in the direction indicated at 74 and positioned to receive lanes of rolled product 16 from the infeed section (not shown). Once the number of lanes and rolled products are in position, individual pusher bars 72 can be moved in the direction D2 to move the rolled products 16 along surface 76 to the discharge section (not shown).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus for laning rolled products, the apparatus comprising:
 a. an infeed section, the infeed section comprising one or more adjacent infeed lanes, each infeed lane conveying a plurality of rolled products in a first direction;
 b. a transfer section, the transfer section receiving one or more of the plurality of rolled products from each lane of the infeed section and conveying the one or more rolled products in a second direction substantially perpendicular to the first direction;
 c. a first discharge section, the first discharge section comprising one or more adjacent discharge lanes for receiving the one or more rolled products from the transfer section, the discharge section conveying the one or more rolled products in a third direction substantially parallel to the first direction;
 d. a second discharge section, the second discharge section comprising one or more adjacent discharge lanes for receiving the one or more rolled products from the transfer section, the discharge section conveying the one or more rolled products in a fourth direction substantially parallel to the first direction;
 e. a first displacement device for transferring rolled products from the transfer section onto the first discharge section; and
 f. a second displacement device for transferring rolled products from the transfer section onto the second discharge section;
 g. wherein the number of discharge lanes in the first discharge section is equal to, less than, or greater than the number of infeed lanes, and the number of discharge lanes in the second discharge section is equal to, less than, or greater than the number of infeed lanes.

2. The apparatus of claim 1, wherein the transfer section comprises a plurality of independently controlled movers, each mover having at least one support bar for supporting a rolled product.

3. The apparatus of claim 1, wherein the transfer section comprises wedge-shaped bars for receiving the rolled product.

4. The apparatus of claim 1, wherein the rolled products comprise rolled paper products.

5. The apparatus of claim 4, wherein the rolled paper products are selected from the group consisting of paper towels and bath tissue.

6. The apparatus of claim 2, wherein the first and second discharge sections each have a surface at a discharge level, and the independently controlled movers can each be set to an elevation such that bottom of the rolled product is positioned at an elevation substantially equal to the respective discharge level.

7. The apparatus of claim 2, wherein the independently controlled movers are mounted on linear motor modules.

8. The apparatus of claim 7, wherein the linear motor modules comprise active elements and the movers comprise reactive elements.

9. The apparatus of claim 8, wherein the reactive elements comprise magnets.

10. A method for laning rolled products, the method comprising the steps of:
   a. providing an infeed section, the infeed section comprising one or more adjacent, parallel infeed lanes;
   b. conveying a plurality of rolled products on each of the adjacent, parallel infeed lanes in a first direction;
   c. providing a transfer section;
   d. receiving a portion of the rolled products from each of the adjacent, parallel infeed lanes onto the transfer section;
   e. transferring the received rolled products on the transfer section in a second direction substantially perpendicular to the first direction; and
   f. discharging a portion of the transferred rolled products onto one or more adjacent, parallel discharge lanes in a third direction substantially parallel to the first direction and,
   g. optionally discharging a portion of the rolled products onto one or more adjacent, parallel discharge lanes in a fourth direction substantially parallel to and opposite the first direction.

11. The method for laning rolled products of claim 10, wherein the number of adjacent, parallel infeed lanes is greater than the number of adjacent, parallel discharge lanes discharged in either the third or fourth direction.

12. The method for laning rolled products of claim 10, wherein the number of adjacent, parallel infeed lanes is less than the number of adjacent, parallel discharge lanes discharged in either the third or fourth direction.

13. The method of laning rolled products of claim 10, wherein the rolled products are rolled paper products.

14. The method of laning rolled products of claim 13, wherein the rolled paper products are selected from the group consisting of paper towels and bath tissue.

15. The method of laning rolled products of claim 13, wherein the transfer section comprises a plurality of independently controlled movers, each mover having at least one support bar for supporting a rolled product.

16. The method of laning rolled products of claim 15, wherein the independently controlled movers are mounted on linear motor modules.

17. The method of laning rolled products of claim 16, wherein the linear motor modules comprise active elements and the mover comprises reactive elements.

* * * * *